United States Patent
Islam (10) Patent No.: US 9,521,155 B1
(45) Date of Patent: *Dec. 13, 2016

(54) SYSTEM, APPARATUS AND METHOD FOR CONDUCTING ON-THE-FLY DECRYPTION OF ENCRYPTED OBJECTS FOR MALWARE DETECTION

(71) Applicant: FIREEYE, INC., Milpitas, CA (US)

(72) Inventor: Ali Islam, Union City, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,327

(22) Filed: Nov. 16, 2015

Related U.S. Application Data (63) Continuation of application No. 14/086,842, filed on Nov. 21, 2013, now Pat. No. 9,189,627.

(51) Int. Cl.

| | |
|---|---|
| *H04L 9/08* | (2006.01) |
| *H04L 29/06* | (2006.01) |
| *H04L 12/28* | (2006.01) |
| *H04L 29/12* | (2006.01) |
| *H04L 12/24* | (2006.01) |
| *H04L 9/00* | (2006.01) |

(52) U.S. Cl.
CPC ......... *H04L 63/1408* (2013.01); *H04L 9/0886* (2013.01); *H04L 12/2865* (2013.01); *H04L 41/50* (2013.01); *H04L 61/15* (2013.01); *H04L 61/1552* (2013.01); *H04L 63/061* (2013.01); *H04L 63/0876* (2013.01); *H04L 63/123* (2013.01); *H04L 9/00* (2013.01); *H04L 9/08* (2013.01); *H04L 9/0894* (2013.01)

(58) Field of Classification Search
CPC .................................................. H04L 41/5096
See application file for complete search history.

(56) References Cited

U.S. PATENT DOCUMENTS

2013/0160125 A1* 6/2013 Likhachev ............ G06F 21/564
726/24

* cited by examiner

*Primary Examiner* — Josnel Jeudy
(74) *Attorney, Agent, or Firm* — Rutan & Tucker, LLP (57) ABSTRACT

A decryption scheme for recover of a decrypted object without a cryptographic key is described. First, logical operation(s) are conducted on data associated with a first data string expected at a first location within an object having the predetermined format and data within the encrypted object at the first location to recover data associated with a portion of a cryptographic key from the encrypted object. Thereafter, logical operation(s) are conducted on that data and a first portion of the encrypted object at a second location to produce a result. Responsive to the result including data associated with the plaintext version of the second data string, logical operation(s) are conducted on a second portion of the encrypted object and the data associated with the plaintext version of the second data string to recover data associated with the cryptographic key. Thereafter, the encrypted object may be decrypted using the cryptographic key.

35 Claims, 8 Drawing Sheets

SYSTEM, APPARATUS AND METHOD FOR CONDUCTING ON-THE-FLY DECRYPTION OF ENCRYPTED OBJECTS FOR MALWARE DETECTION

This is a Continuation application claiming the benefit of priority on U.S. patent application Ser. No. 14/086,842 filed Nov. 21, 2013, which is incorporated by reference in its entirety.

1. FIELD

Embodiments of the disclosure relate to the field of network security. More specifically, one embodiment of the disclosure relates to a system, apparatus and method for conducting on-the-fly decryption of encrypted objects for malware detection.

2. GENERAL BACKGROUND

Over the last decade, malicious software (malware) has become a pervasive problem for Internet users. In some situations, malware is an exploit, in the form of an executable program for example, which is embedded within downloadable content and designed to adversely influence or attack normal operations of a computer. Examples of different types of exploits may include bots, computer viruses, worms, Trojan horses, spyware, adware, or any other programming that operates within an electronic device (e.g. computer, tablet, smartphone, server, router, wearable technology, or other types of electronics with data processing capability) without permission by the user or an administrator.

For instance, exploits may be present in one or more files infected through any of a variety of attack vectors, where the files are part of network traffic. For instance, as an illustrative example, the file may have a Portable Executable (PE) file format where the exploit is activated upon execution (opening) of the file.

Currently, malware detection systems are deployed to extract content from plaintext files within network traffic and analyze such content for malware. However, given that there has been a significant increase in malware propagation through the use of encrypted files, especially files encrypted through use of an Exclusive OR (XOR) function, additional functionality is needed to conduct real-time malware analysis of these types of encrypted files.

It is noted that the conventional method for analyzing encrypted files for malware involves a computationally intensive, brute-force technique. More specifically, this "brute-force" technique is a rudimentary key detection scheme in which iterative decryption operations are conducted on an encrypted file using different key combinations in the hopes of recovering the plaintext version of the file. For instance, in order to recover plaintext from a file encrypted with a one-byte XOR key, this brute-force technique would undergo up to 256 ($2^8$) iterative decryption operations. However, in order to recover the plaintext from a file encrypted with a two-byte XOR key or a three-byte XOR key, this brute-force technique would need to undergo up to 65,536 ($2^{16}$) iterative decryption operations or over 16 million ($2^{24}$) iterative decryption operations, respectively.

Clearly, the current brute-force technique is unsuitable for real-time (on-the-fly) malware analysis.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Various embodiments of the disclosure relate to an electronic device having network connectivity, such as a malware content detection (MCD) system for example, where the electronic device comprises a static analysis engine that is configured to conduct on-the-fly (real-time) decryption of one or more encrypted objects within network traffic prior to subsequent virtual machine (VM) based analysis of the object for malware. For instance, the objects may be encrypted according to a Vigenére cipher and real-time decryption may be conducted and completed on information currently in transit over a network and prior to receipt of the information by the intended destination. Herein, "network traffic" may be information currently in transit over a network or stored information (e.g. received over the network).

More specifically, according to one embodiment of the disclosure, the static analysis engine within the MCD system may be configured to conduct a first static scanning operation, which involves conducting a first set of operations on an incoming object to (i) determine if the object is encrypted and (ii) verify that the encrypted object has a particular format type. This determination and verification may be accomplished by conducting one or more logical operations on portion(s) of the encrypted object at one or more prescribed address offsets (as stored in memory) and expected (known) data at that prescribed address offset if the object features the particular format.

According to one embodiment of the disclosure, where the object is a file, the particular format type may be a Portable Executable (PE) file format for example. Of course, the invention may be directed to a variety of object or format types, although the operations conducted to decrypt an encrypted file having a PE file format (hereinafter referred to as a "PE file") are described herein for illustrative purposes. In general, the PE file has a data structure that encapsulates the information necessary for the Windows® operating system (OS) loader to manage the wrapped executable code.

Noted file extensions for some types of PE files include the following: (i) .cpl; (ii) .exe; (iii) .dll; (iv) .ocx; (v) .sys; (vi) .scr; (vii) .drv; or (viii) .efi.

Upon verification that the encrypted object has the particular format type, the cryptographic key used for encrypting the encrypted object may be recovered. The cryptographic key may be recovered during the first set of operations as when the key is a single byte in length. Otherwise, the cryptographic key may be recovered and verified through a second set of operations involving further logical operation(s) between different portions of the encrypted object at prescribed address offsets and known (expected) data at such addresses in accordance with an object having the particular format type.

After recovery of the cryptographic key, the encrypted object may be decrypted to recover the object in plaintext. Based on availability of the plaintext object, the static analysis engine conducts a second static scanning operation to analyze whether content associated with the object includes malware. Such analysis is directed to analyzing information within the object itself and/or analyzing the format of the object to identify protocol deviations (e.g. changes to header information, etc.). Stated differently, the second static scanning operation may include heuristic checks.

More specifically, one type of heuristic check includes scanning operations conducted on content within the object to determine whether the presence, absence or modification of information may denote potential malicious activity and the presence of malware. Such scanning comprises rule-based data analysis. For example, where the object is an executable (.exe) file, the file may include a function call (e.g. "Connect( )") and identify one or more parameters passed to that function such as a particular website (e.g. "www.XYZ.com"). A rule adapted to control network connectivity may identify the "Connect" pattern as a Hypertext Transfer Protocol (HTTP) request and passed parameters. Where the passed parameter is either (i) not a specific or recognized parameter or website or (ii) directed to a known malicious pattern, malicious activity is detected, namely there is a reasonable likelihood that the executable file is infected with malware.

Another type of heuristic check includes scanning operations conducted to determine whether any content within or associated with the recovered plaintext object includes information that is correlated to (or matches) one or more "malware identifiers", which may include, but are not limited or restricted to exploit patterns, names of vulnerable functions that are known to be susceptible to exploits, and/or malicious patterns (e.g. shell code patterns, Return Oriented Programming "ROP" patterns, etc.).

After scanning operations conducted by the static analysis engine, the object may be provided to the dynamic analysis engine for more in-depth dynamic analysis using one or more virtual machines (VMs) for processing of the object in a more complete run-time environment in which content within the objects is virtually executed and its behavior is monitored for detection of anomalous or unexpected activity indicative of malware.

It is contemplated that embodiments of the invention are described for an object processed in accordance with a Windows®-based OS, such as a PE file for example, but the invention may be practiced for objects associated with any type of OS including, but not limited or restricted to a MAC® OS, Linux®, or any mobile OS (e.g. iOS™, Chrome™ OS, etc.).

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data associated with network traffic, namely information currently in transit over a network or stored information. One example of an object may include an executable file, non-executable file (e.g. dynamic link library "DLL"), or one or more messages. A "message" may be in the form of a packet, a frame, an Asynchronous Transfer Mode "ATM" cell, a data flow (e.g. a group of related messages), or any other series of bits having a prescribed format. For example, the object may be part of network traffic transmitted using a Hypertext Transfer Protocol (HTTP), Hypertext Markup Language (HTML) protocol, or may be transmitted in a manner suitable for display on a Web browser software application. It is noted that the object may be encrypted in accordance with a particular encryption scheme (e.g. an Exclusive OR "XOR" function).

As another illustrative example, the object may be an electronic mail (email) message transmitted using a particular protocol including, but not limited to an email protocol such as Simple Mail Transfer Protocol (SMTP), Post Office Protocol version 3 (POP3), or Internet Message Access Protocol (IMAP4). Furthermore, the object may be an Instant Message, which may be transmitted using Session Initiation Protocol (SIP) or Extensible Messaging and Presence Protocol (XMPP) for example, or even some form of unstructured data or structured data in a file format.

The term "malware" is directed to software that produces an undesired behavior upon execution, where the behavior is deemed to be "undesired" based on customer-specific rules, manufacturer-based rules, or any other type of rules formulated by public opinion or a particular governmental or commercial entity. This undesired behavior may include a communication-based anomaly or an execution-based anomaly that would (1) alter the functionality of an electronic device executing application software in a malicious manner; (2) alter the functionality of an electronic device executing that application software without any malicious intent; and/or (3) provide an unwanted functionality which may be generally acceptable in another context.

The term "transmission medium" is a communication path between two or more systems (e.g. any electronic devices with data processing functionality such as, for example, a security appliance, server, mainframe, computer, netbook, tablet, smart phone, router, switch, bridge, firewall, or brouter). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the term "compare" generally means determining if a match or a certain level of correlation is achieved between two items where one of the items may include the content of a files or a particular identifier.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

First Embodiment

Figure 1A:
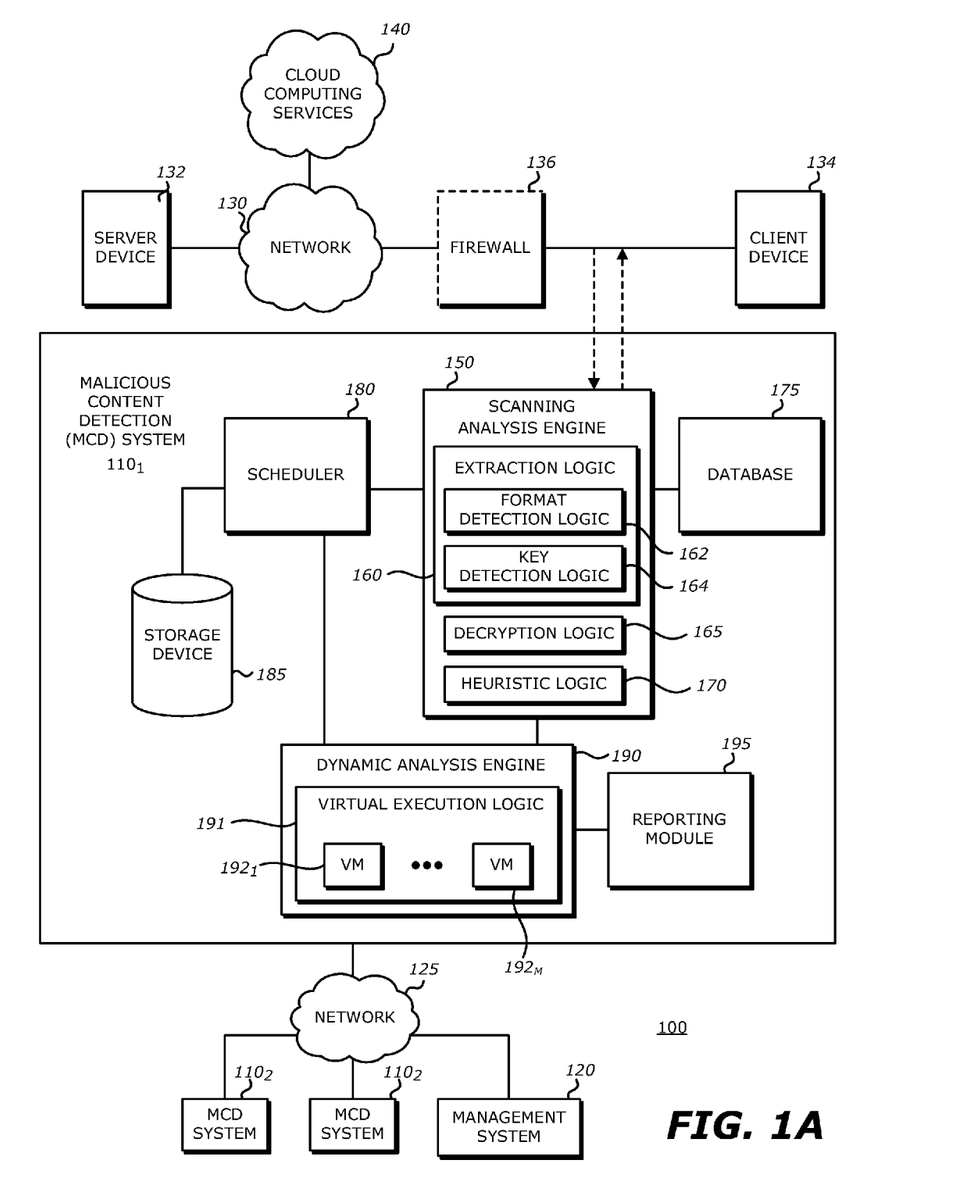
FIG. 1A is a first exemplary block diagram of a communication system deploying a plurality of malware content detection (MCD) systems with framework for on-the-fly (real-time) decryption of encrypted objects for malware detection.

Referring to FIG. 1A, an exemplary block diagram of a communication system 100 deploying a plurality of malware content detection (MCD) systems $110_1$-$110_N$ (N>1, e.g. N=3) communicatively coupled to a management system 120 via a network 125 is shown. In general, management system 120 is adapted to manage MCD systems $110_1$-$110_N$. For instance, management system 120 may be adapted to cause one or more malware identifiers, each of which being information representative of prior detected malware, to be shared among some or all of the MCD systems $110_1$-$110_N$ for use in heuristic checks. The malware identifiers may be in plaintext form or may be representative of encrypted data that has been determined to be associated with malware. Such sharing may be conducted automatically or manually uploaded by an administrator. Also, such sharing may be conducted freely among the MCD systems $110_1$-$110_N$ or subject to a subscription basis.

Herein, according to the embodiment illustrated in FIG. 1A, a first MCD system $110_1$ is an electronic device that is adapted to analyze information associated with network traffic routed over a communication network 130 between at least one server device 132 and at least one client device 134. The communication network 130 may include a public network such as the Internet, in which case an optional firewall 136 (represented by dashed lines) may be interposed prior to accessing client device 134. Alternatively, the communication network 130 may be a private network such as a wireless telecommunication network, wide area network, or local area network, or a combination of networks. While embodiments of the invention are described as being conducted on objects in transit (e.g, received over the communication network 130), other embodiments may include the invention being practiced on stored objects or an object provided as a specimen.

As shown in FIG. 1A, the first MCD system $110_1$ comprises a static analysis engine 150, a database 175, a scheduler 180, a storage device 185, a dynamic analysis engine 190 and a reporting module 195. In some embodiments, although not shown, a network interface may be contained within the first MCD system $110_1$. Also, static analysis engine 150, scheduler 180 and/or dynamic analysis engine 190 may be software modules executed by a processor that receives one or more objects and performs a multi-level static scan including encryption analysis on the object, which may involve accessing one or more non-transitory storage mediums operating as database 175, storage device 185 and/or reporting module 195. In some embodiments, the static analysis engine 150 may be one or more software modules at least partially forming a static framework, where such software modules are executed by a processor. The static analysis engine 150 and the dynamic analysis engine 190 may be one or more software modules executed by the same processor or different processors, where these different processors are possibly located at geographically remote locations, located within the same processor package (e.g. different processor cores) and/or communicatively coupled for example via a network.

In general, the static analysis engine 150 may be communicatively coupled to receive one or more objects associated with network traffic routed over communication network 130, such as an object that is part of a series of HTTP packets forming the network traffic for example. The static analysis engine 150 conducts a first static scanning operation on the object. The first static scanning operation comprises a first set of operations and a second set of operations.

The first set of operations is adapted to determine (1) whether the object is encrypted, notably with a Vigenère cipher and (2) whether the object has a particular format type. Based on determinations that the object having the particular format type is encrypted, the second set of operations is conducted to recover the cryptographic key associated with the encrypted object. The cryptographic key is used to recover a plaintext version of the object from the encrypted object.

More specifically, according to one embodiment of the disclosure, the static analysis engine 150 comprises extraction logic 160 that is configured to conduct a first static scanning operation on the object that is part of the network traffic to determine whether the object is encrypted, and if so, whether the encrypted object has a particular format type. In the event that the encrypted object has the particular format type, the extraction logic 160 determines the cryptographic key used for encryption of the object. Thereafter, decryption logic 165 within the static analysis engine 150 is configured to decrypt the encrypted object using the cryptographic key in order to recover the object in a plaintext format.

Thereafter, the heuristic logic 170 within the static analysis engine 150 conducts a second static scanning operation on the plaintext object. The second static operation is designed to potentially classify the object as "malicious," depending on whether the object is determined to have at least one characteristic associated with malware. This classification scheme features heuristic checks that determine if content associated with the object has a certain level of correlation with one or more malware identifiers. The level of correlation (e.g., exact pattern match to matching a majority of the pattern) may be non-modifiable or may be adjustably set by an administrator. The classification may further feature analysis of the content to determine whether presence, absence or modification of any data denotes the presence of malware.

For instance, the heuristic logic 170 may classify the object according to a first threat level (e.g. "suspicious"—assigned a score less than or equal to a first threshold) when at least one characteristic identified during scanning operations conducted on the object indicates a certain level of probability that the object includes malware. Similarly, the heuristic logic 170 may classify an object with a second level (e.g. "malicious"—assigned a score greater than or equal to a second threshold that is greater than the first threshold) when at least one characteristic observed during scanning operations conducted on the object indicates a high level of probability that the object includes malware.

A. Exemplary First Static Scanning Operation

Figure 3:
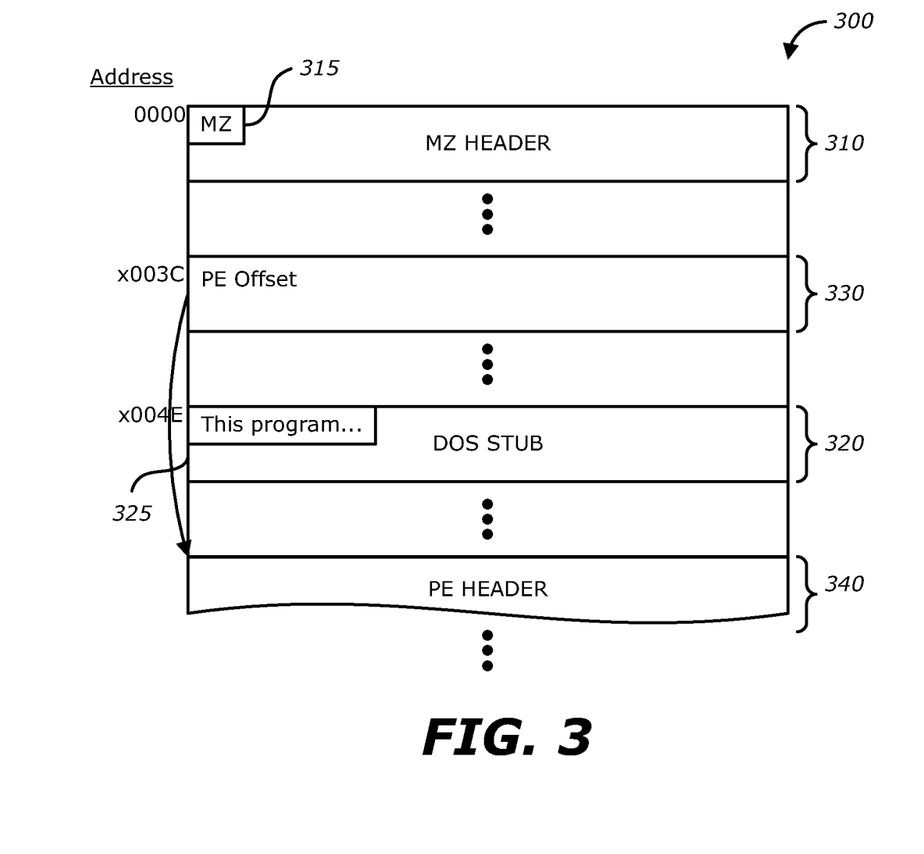
FIG. 3 is an illustrative embodiment of a particular object being a file having a Portable Executable (PE) file format.

Exemplary operations of the static analysis engine 150 are described below. After receipt of an object, the extraction logic 160 of the static analysis engine 150 conducts a first static scanning operation on the object in order to determine whether the object is encrypted, and if so, whether the encrypted object has a particular format type. In particular, format detection logic 162 is configured to conduct the first set of operations that initially recover a partial key from the encrypted object. This "partial key" is a portion of the entire cryptographic key, where the partial key may be used to verify that the object has a particular format type. The particular format type may include any format where known data is placed at specific address locations for that object. For instance, as illustrated in FIG. 3 and described below, a PE file has known data ("MZ", DOS Stub statement, PE offset, etc.) at specific memory address offsets.

As an illustrative example, a first segment of the encrypted object may undergo one or more logical operations with particular data (e.g., data string of alphanumeric characters "MZ" as used in the legacy DOS format) to produce the partial key. The logical operation(s) may correspond to an Exclusive OR (XOR) operation. Thereafter, a second segment of the encrypted object, namely encrypted data starting at a prescribed address, undergoes a logical operation (e.g. an XOR operation) with the partial key to produce a result.

For instance, according to one embodiment of the disclosure, the prescribed address may be a fixed offset (e.g. x004E) from the starting address (e.g. x0000) for the object. Where the object is in a Portable Executable (PE) file format, the second segment stored at the prescribed address is associated with a DOS Stub, namely a piece of legacy code still within Microsoft®-based files. If run on a Disk Operating System (DOS), the DOS Stub would display a statement being a data string such as "This program cannot be run in DOS." It is noted that the fixed offset (x004E) may slightly vary based on compiler type and there are a few data (character) strings for different DOS Stub statements, all of which are known. Therefore, if the result does not match anticipated data (character) string for one type the DOS Stub statement, comparisons may be conducted for different known data (character) strings to confirm that the object is a file associated with a PE format.

Likewise, if a match is not detected, slight adjustments to the prescribed address may be conducted in order to confirm that the object was not compiled by a compiler using a different DOS Stub address. Moreover, these adjustments from the fixed offset (e.g. x004E) may be conducted so that analysis of encrypted data addressed for the DOS Stub statement starts at the beginning of an encryption cycle (e.g. remainder=(predefined offset % key length)=0, where "%" is a modular operator returning a remainder). For instance, for a four-byte key, the prescribed address may begin at x0050 (e.g., remainder=(prescribed address offset % key length); encryption cycle begins at prescribed address offset along with key length—remainder).

Based upon detection that the encrypted object is associated with the particular format type, such as the PE file format for example, key detection logic 164 conducts operations on portions of the encrypted object to recover and verify recovery of the key. According to one embodiment of the disclosure, the key detection logic 164 may conduct a first operation to recover the PE Header Offset, where the first operation may comprise an Exclusive OR (XOR) operation between the recovered key and a third segment of the encrypted object starting at a known address offset for the PE header offset. The recovered key simply may be part of the partial key, where the key is a single-byte key. Otherwise, the key includes the partial key and may be obtained through a key window, namely the result produced by conducting an XOR operation of the encrypted data starting at the prescribed address along with the anticipated DOS Stub statement. The key is determined as a repetitive string of alphanumeric characters within the result.

Thereafter, using the received PE Header Offset, a second operation is conducted to verify that the key is the decryption key for the object. The second operation may involve an XOR operation of (1) a few bytes of encrypted data associated with the PE header at the PE Header Offset address and (2) the key. If the result produces a specific character pattern (e.g. "PE00"), which identifies the start of the PE header, the key is verified. Thereafter, the key has been recovered and may be used by decryption logic 165 to decrypt the encrypted object to recover a plaintext version of the object.

B. Exemplary Second Static Scanning Operation

As described above, the heuristic logic 170 conducts a second static scanning operation to statically scan the content of the object for malware identifiers. In other words, the static analysis engine 150 performs a first static scan by comparing the contents of each object with malware and/or correlation between identifiers to determine an existence of malware which can be, but is not limited to exploit patterns, names of vulnerable functions, shell code patterns, heap spray patterns, etc.

If the comparison reveals a correlation between the contents of the object and one or more malware identifiers (hereinafter referred to as a "match"), which denotes a malicious event, the heuristic logic 170 may assign a score (e.g., an indicator of the likelihood of the analyzed file including malware) to the analyzed object. The heuristic checks applied by the heuristic logic 170 may be based on data and/or rules stored in the database 175. Also, the heuristic logic 170 may examine portions of an image of the object without executing or opening any content associated with the object.

As previously described, there are different degrees of maliciousness. Where there is a first level of likelihood of an object being infected with malware, the object may be classified with a lower "malicious" grade (sometimes referred to as "suspicious"), which may be represented by a score corresponding to the likelihood of malware being present in the object (e.g., score of 3 out of 10). Where there is a second level of likelihood of an object being infected with malware, the object may be classified with a higher "malicious" grade, normally represented by a higher score (e.g., score of 8 out of 10).

The assigning of a score may be performed, in some embodiments, by assigning a score to content under analysis that is associated with the object, and then mathematically combining the scores for different content to obtain an overall score for the object. Thereafter, the object and score may be routed from the static analysis engine 150 to the dynamic analysis engine 190 for use in further analysis to establish (where previously deemed as suspicious) or confirms (where previously deemed to be malicious) the presence of malware within the object.

If no malicious event is initially detected, the heuristic logic 170 may halt further analysis of the object, or based on the encrypted format of the object, forward the object to the dynamic analysis engine 190.

C. Exemplary Dynamic Scanning Operations

After static scanning, the object may be presented to the dynamic analysis engine 190 for more in-depth dynamic analysis using virtual machines (VMs) $192_1$-$192_M$ (M≥1) for processing of the file in a more complete run-time environment in which content within the objects is virtually executed.

The scheduler 180 may retrieve and configure the VMs $192_1$-$192_M$ to mimic the pertinent performance characteristics of the client device 134. In one example, the scheduler 180 may be adapted to configure the characteristics of a particular VM $192_1$ within virtual execution logic 191 to mimic only those features of the client device 134 that are affected by the data traffic provided by the network interface 138. The scheduler 180 may determine the features of the client device 134 that are affected by the content by receiving and analyzing the network traffic from the network interface 138. Such features of the client device 134 may include any hardware and/or software functionality that can be virtualized within the virtual execution logic 191 such as the following: (i) virtual ports that are configured to receive the content or may be used by applications running in a virtual environment to process the content for outbound communications, (ii) certain virtual device drivers that are to respond to the content or to applications that process the content, (iii) software applications on client device 132 or software that the object would need to process the content, and/or (iv) any other devices coupled to or software contained within the client device 134 that can respond to the content.

In another embodiment of the disclosure, the static analysis engine 150 may determine the features of the client device 134 that are affected by the network traffic by receiving and analyzing the content from the network interface 138. The static analysis engine 150 may then transmit the features of the client device to the scheduler 180 and/or dynamic analysis engine 190.

The dynamic analysis engine 190 is adapted to execute one or more VMs to simulate the receipt and/or execution of different potentially "malicious" content within an object under analysis (analyzed object) within a run-time environment as expected by the type of object, as noted above. The run-time environment may be one selected to mimic one that is prevalently provided by client devices, or, in alternative embodiments, one that can be provided by the client device 134 in particular, or an environment that is required for the object to be processed including software such as a web browser application or Microsoft® Word for objects constituting documents. Furthermore, the dynamic analysis engine 190 analyzes the effects of such content upon the run-time environment, such as the client device 134. Such effects may include unusual network transmissions, unusual changes in performance, and the like. This detection process is referred to as a dynamic malicious content detection.

The dynamic analysis engine 190 may flag the malicious content as malware according to the observed behavior of content and software executed within the VM. The reporting module 195 may issue alerts indicating the presence of malware, and using pointers and other reference information to identify what message(s) (e.g. packet(s)) may contain malware. Additionally, the server device 132 may be added to a list of malicious network content providers, and future network transmissions originating from the server device 132 may be blocked from reaching their intended destinations, e.g., by firewall 136.

Of course, in lieu of or in addition to static scanning operations being conducted by MCD systems $110_1$-$110_N$, it is contemplated that cloud computing services 140 may be implemented to perform the first static scanning operation directed to identifying and decrypting encrypted objects, as described herein. In accordance with this embodiment, MCD system $110_1$ may be adapted to establish secured communications with cloud computing services 140 for exchanging information.

III. General Architecture

Second Embodiment

Figure 1B:
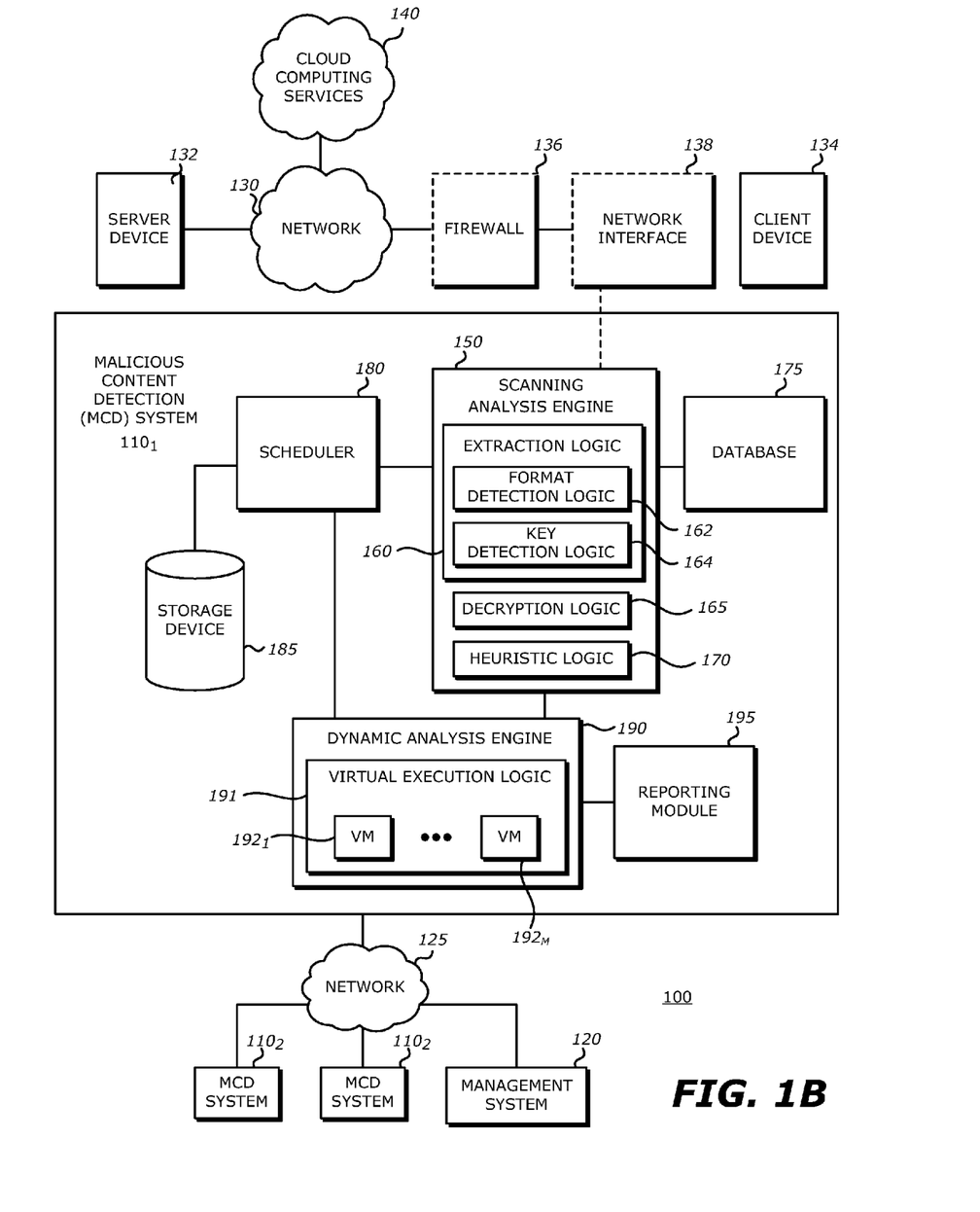
FIG. 1B is a second exemplary block diagram of a communication system deploying a plurality of MCD systems with framework for on-the-fly (real-time) decryption of encrypted objects for malware detection.

Referring now to FIG. 1B, first MCD system $110_1$ may be coupled with the communication network 130 via a network interface 138. The network interface 138 operates as a data capturing device (referred to as a "tap" or "network tap") that is configured to receive data traffic propagating to/from the client device 134 and provide content from the data traffic to the first MCD system $110_1$. Alternatively, as shown in FIG. 1A, the first MCD system $110_1$ is shown as being coupled with the communication network 130 (behind the firewall 136) and in line with client device 134.

In general, the network interface 138 of FIG. 1B receives and duplicates objects associated with network traffic that are received from and provided to client device 134 normally without an appreciable decline in performance by the server device 140, the client device 134, or the communication network 130. The network interface 138 may duplicate any portion of the content, for example, one or more files that are part of a data flow or part of the payload contained within certain data packets, or the like.

In some embodiments, the network interface 138 may capture metadata from network traffic intended for client device 134. This metadata may be used, at least in part, to determine prescribed addressing offsets used for decryption operations. For instance, the metadata may include information to identify a selected compiler for the object.

It is contemplated that, for any embodiments where the first MCD system $110_1$ is implemented as a dedicated appliance or a dedicated computer system, the network interface 138 may include an assembly integrated into the appliance or computer system that includes network ports, network interface card and related logic (not shown) for connecting to the communication network 130 to non-disruptively "tap" data traffic propagating through firewall 136 and provide a copy of the data traffic to the static analysis engine 150. In other embodiments, the network interface 138 can be integrated into an intermediary device in the communication path (e.g., firewall 136, router, switch or other network device) or can be a standalone component, such as an appropriate commercially available network tap. In virtual environments, a virtual tap (vTAP) can be used to duplicate files from virtual networks.

IV. Exemplary Logic Layout of MCD System

Figure 2:
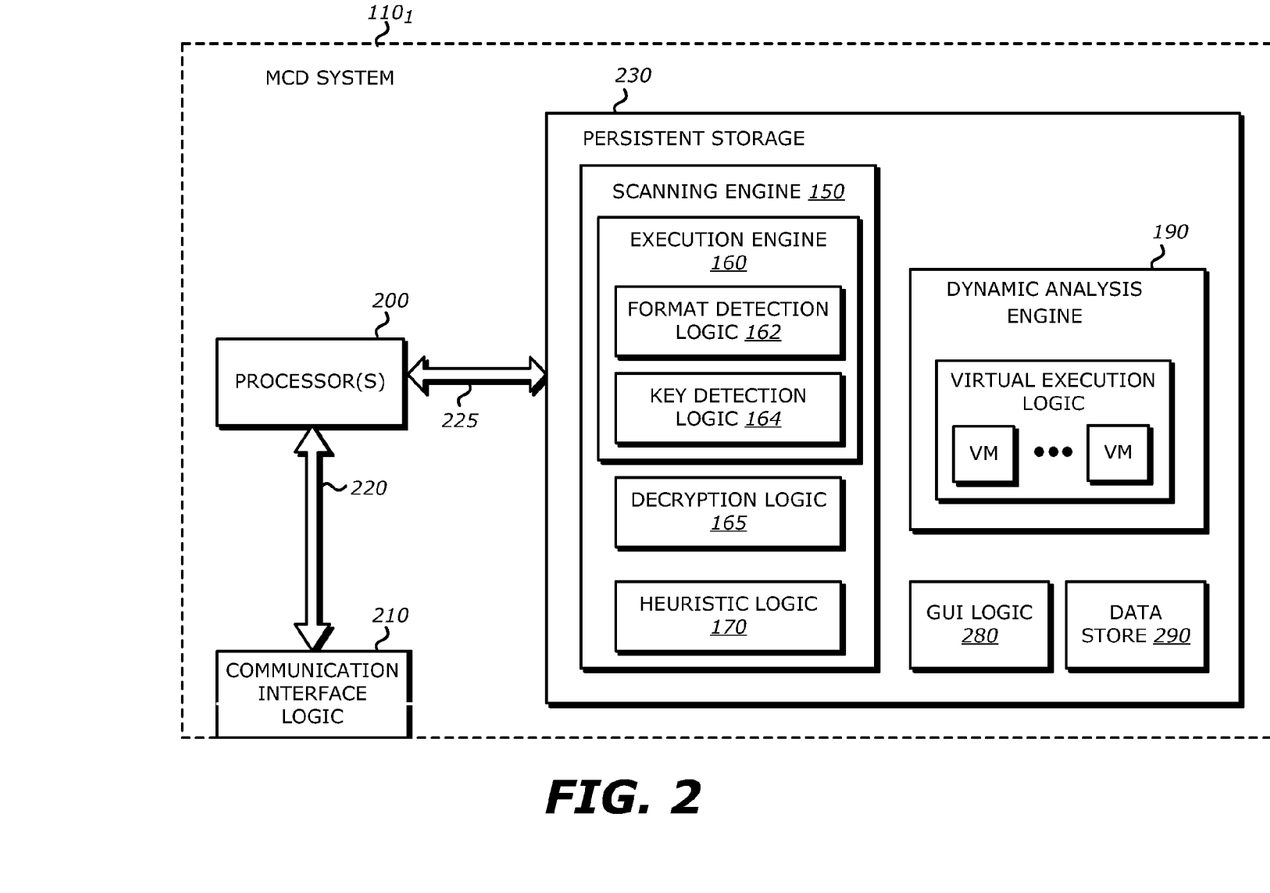
FIG. 2 is a detailed exemplary block diagram of logic associated with one of the MCD systems of FIG. 1A or 1B.

Referring now to FIG. 2, an exemplary block diagram of logic associated with MCD system $110_1$ of FIGS. 1A-1B is shown. MCD system $110_1$ comprises one or more processors 200 that are coupled to communication interface logic 210 via a first transmission medium 220. Communication interface logic 210 enables communications with other MCD systems $110_2$-$110_N$ and management system 120 of FIG. 1. According to one embodiment of the disclosure, communication interface logic 210 may be implemented as a physical interface including one or more ports for wired connectors. Additionally, or in the alternative, communication interface logic 210 may be implemented with one or more radio units for supporting wireless communications with other electronic devices.

Processor(s) 200 is further coupled to persistent storage 230 via transmission medium 225. According to one embodiment of the disclosure, persistent storage 230 may include the static analysis engine 150, which comprises (i) extraction logic 160 that includes format detection logic 162 and key detection logic 164; (ii) decryption logic 165, and (iii) heuristic logic 170. Of course, when implemented as hardware, logic 160 (162, 164), 165, and/or 170 could be implemented separately from persistent memory 230.

Format detection logic 162 comprises one or more software modules that conduct a first static analysis operation on an incoming object. This operation includes an analysis of different segments of an incoming object to determine if the object is encrypted and whether the object has a particular format type. If not, the real-time analysis of the object may be terminated, or other analysis (including non-real time forensic review) may be invoked. Upon confirming that the object is encrypted according to the particular format type, the key detection logic 164 performs a second static analysis operation.

The key detection logic 164 comprises one or more software modules that conduct operations using one or more segments of the encrypted content and known content at certain address locations within the encrypted content based on its particular format. These operations are used to recover a cryptographic key used to encrypt the incoming object.

The decryption logic 165 comprises one or more software modules that conduct decryption operations on the encrypted object using the recovered cryptographic key. One type of decryption operation includes an XOR function, which does not require a library and is easy to instrument.

Heuristic logic 170 comprises one or more software modules to conduct static scanning of content within the plaintext version of the object to determine whether content within the object includes malware identifiers, such as information associated with known malware exploits. The heuristic logic 170 may conduct, in some embodiments, a malware signature matching operation. As an example, heuristic logic 170 may be initially invoked to conduct static scanning of content in the file, which includes conducting pattern comparison operations (e.g. bitwise comparison, byte-wise comparison, etc.) between accessible file content and malware identifiers associated with known exploit patterns, vulnerable functions and malicious patterns obtained from data store 290.

Subsequently, after failing to detect any malicious events, the heuristic logic 170 may provide the object to the dynamic analysis engine 190, given the presumption that an encrypted object, such as an encrypted executable file, denotes a suspicious event.

Continuing the above example, in order to convey findings, processor(s) 200 may invoke GUI logic 280, which provides one or more screen displays for conveying a more detailed summary of malicious files being detected by MCD system $110_1$. In some embodiments, the MCD system $110_1$ may also contain remediation logic (not shown) to initiate remediation of identified malware and recovery from the identified exploit.

V. On-the-Fly Decryption of Encrypted Objects

Referring to FIG. 3, an exemplary diagram of on-the-fly decryption of a particular object, such as a file with a PE format, is shown. Herein, the PE format 300 comprises a MS-DOS header 310, a DOS Stub 320, a PE offset 330 and a PE header 340. Herein, the MS-DOS header 310 is part of the original DOS executable file format that is present in files with PE formats for backward compatibility. The main reason for keeping the same structure intact at the beginning of the PE file format is so that, upon attempting to load a file created with an early Windows® or MS-DOS version, the operating system can read the file and understand that it is not compatible by generating a predetermined message. The first field 315 of the MS-DOS header, referred to as the "magic number," is used to identify the file as an MS-DOS-compatible file type. All MS-DOS-compatible executable files set this value to 0x54AD, which represents the alphanumeric characters "MZ".

The DOS stub 320 is an actual program run by MS-DOS when the executable is loaded. For an actual MS-DOS executable image file, the application begins executing at the DOS Stub 320. For successive operating systems, including Windows® for example, an MS-DOS stub program is part of the PE format to, when executed by version of an operating system, display as output a prescribed line of text—the DOS Stub statement 325.

The PE offset 330 is an offset into the file where the PE file header 340 is located. It is necessary to use this offset to locate the PE header in the file. For certain PE files, the PE file header occurs soon after the MS-DOS header 310 with the DOS stub program 320 between them.

The PE file header 340 includes a field that instructs the electronic device how much memory needs to be set aside for mapping the executable into memory.

Figure 4:
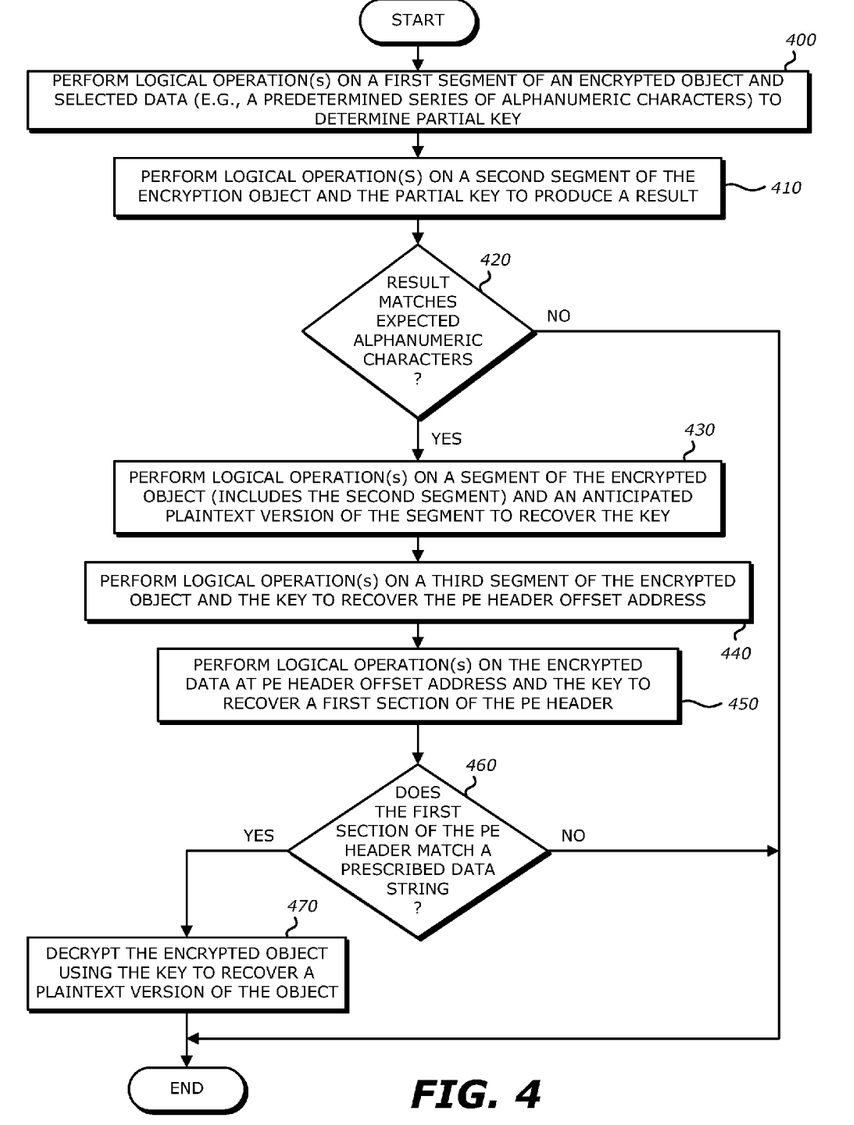
FIG. 4 is an exemplary flowchart illustrating the first static scanning operations conducted on an encrypted object by logic within a MCD system of FIG. 1A or 1B.

Referring to FIG. 4, an exemplary flowchart illustrating first static scanning operation of an encrypted object, such as an encrypted PE file for example, is shown. Once the PE file is received, one or more logical operations are conducted on both a first segment of the encrypted object (PE file) and selected data (e.g. a predetermined series of data such as an alphanumeric character string "MZ") to produce the partial key (block 400). The logical operation(s) are functionally equivalent to an Exclusive OR (XOR) operation. Thereafter, one or more logical operations (e.g. an XOR operation) are conducted on the partial key and a second segment of the encrypted object, namely encrypted data starting at a prescribed address, to produce a result (block 410). As previously described, according to one embodiment of the disclosure, the prescribed address may be a fixed offset that stores the DOS Stub statement, which includes a series of alphanumeric characters.

Thereafter, the result is compared to a portion of one or more DOS Stub statements maintained within the database 175 of FIGS. 1A-1B (block 420). Upon detecting a successful match, in order to recover the key associated with the encrypted object, one or more logical operations (e.g. an XOR operation) are conducted on the encrypted DOS Stub statement and a particular plaintext version of the anticipated DOS Stub statement maintained in the database 175 (block 430). The key may be determined by analyzing the result of the XOR operation for a repeating data pattern, where the repeating data pattern constitutes the key.

Thereafter, one or more logical operations (e.g. an XOR operation) are conducted on a third segment of the encrypted object at a second prescribed address and the key in order to produce a result (block 440). According to this embodiment of the disclosure, this result constitutes the PE Header Offset address that is used to locate the PE Header associated with the PE file. Next, one or more logical operations (e.g. an XOR operation) are conducted on encrypted data at the PE Header Offset address to determine if the resultant data matches a predetermined data string (e.g. a particular series of alphanumeric characters) as set forth in blocks 450 and 460. If so, the key is verified and the decryption logic utilizes the key to decrypt the encrypted object to recover a plaintext version of the object for subsequent malware analysis as described above (block 470).

Figure 5A:
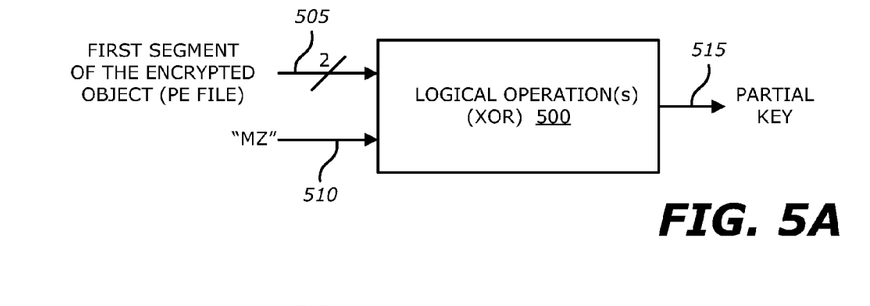
FIGS. 5A-5G are exemplary block diagrams illustrating the first static scanning operations conducted on an encrypted object by logic within a MCD system of FIG. 1A or 1B.
Figure 5B:
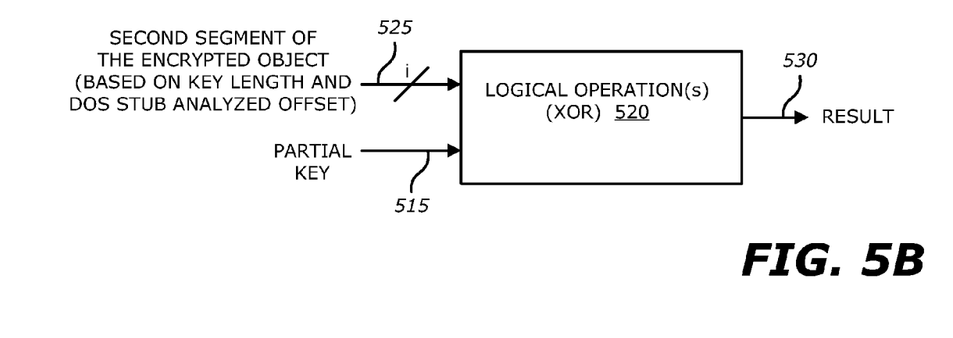

Referring to FIGS. 5A-5G, exemplary block diagram illustrating the first static scanning operation of an encrypted object, such as an encrypted file having a PE format (hereinafter a "PE file") is shown. Once the PE file is received, the format detection logic 162 of FIGS. 1A-1B initially conducts an XOR operation 500 on a first segment of the encrypted PE file 505 (e.g. starting 2-bytes of the PE file) and a character string "MZ" 510 to produce a partial key 515. Thereafter, as shown in FIG. 5B, the format detection logic 162 conducts an XOR operation 520 on the partial key 515 and a second segment of the encrypted object 525 starting at a prescribed address (e.g. "i" bytes of encrypted data associated with the displayable statement of the DOS Stub, i≥4), to produce a result 530. The prescribed address may vary slightly, depending on the analyzed key length and uncovered address for the DOS Stub.

As an illustrative example, for a 4-byte key being used to encrypt the entire PE file, the starting character "T" of the DOS Stub statement "This Program . . . " at address x004E may be encrypted with the $3^{rd}$ byte of the key. The $4^{th}$ byte of the key will be applied to "h". So the next cycle will start at "i" (e.g. Start_address offset+2 namely x004E+x0002). Hence, the second segment 525 may be "is" (address x0050) so as to be aligned with the encryption cycle.

Figure 5C:
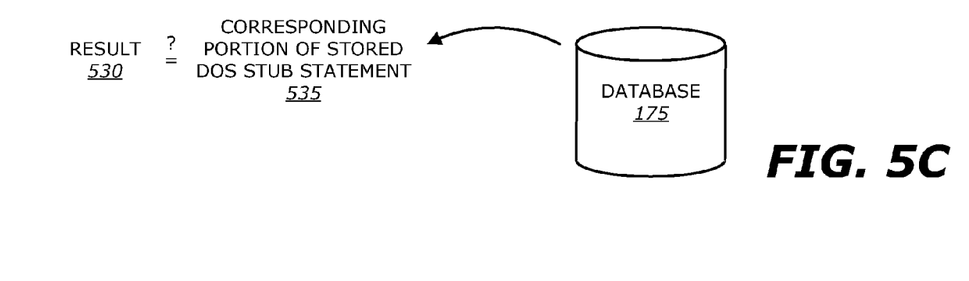

Thereafter, as shown in FIG. 5C, the result 530 is compared to a corresponding portion 535 of one or more DOS Stub statements maintained within the database 175. The corresponding portion 535 may be based on a starting point of the DOS Stub statement or a few characters from the starting point depending on a beginning of the first full encryption cycle occurring for the DOS Stub, as described above.

Figure 5D:
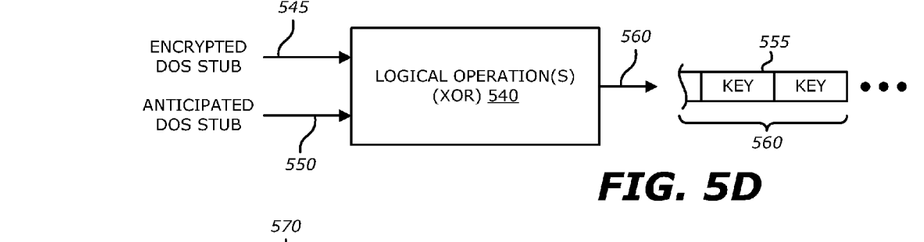

Upon detecting a successful match, the key detection logic conducts an XOR operation 540 on encrypted data 545 corresponding to placement of the DOS Stub statement and the anticipated DOS Stub statement 550 that includes the corresponding portion 535 the DOS Stub statement. The result 560 of the XOR operation 540 is used to recover a key 555 associated with the encrypted object. The key 555 may be determined by analyzing the result 560 of the XOR operation 540 for a repeating data pattern, which would constitute the key 555.

Figure 5E:
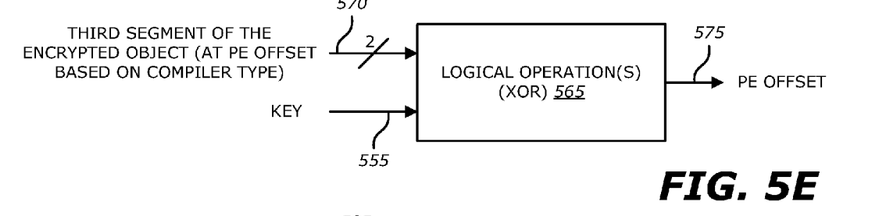
Figure 5F:
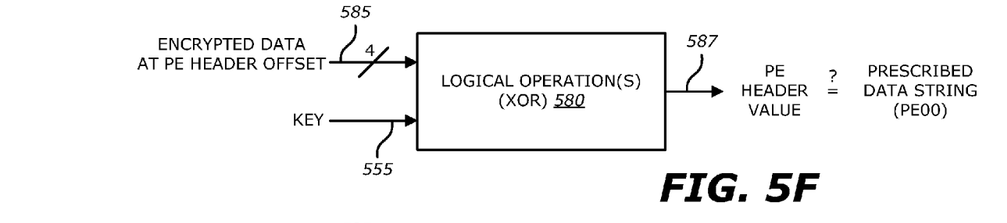
Figure 5G:
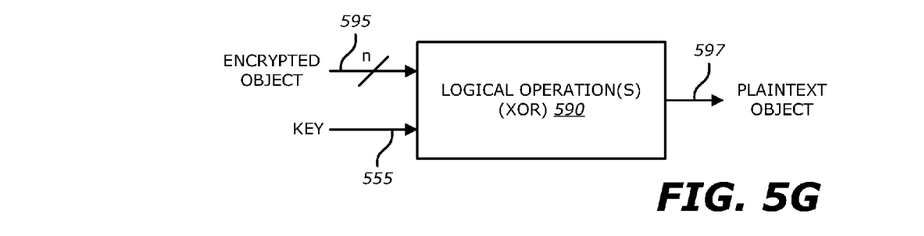

Thereafter, the key detection logic performs an XOR operation 565 on a third segment 570 of the encrypted object (e.g. 2-bytes) at a second prescribed address and the key 555 in order to produce a result 575. This result 575 constitutes the PE Header Offset address that it used to locate the PE Header of the encrypted PE file. Next, the key detection logic performs an XOR operation 580 on both the encrypted data (e.g. 4-bytes) 585 at the PE Header Offset address and the key 555 to determine if the resultant data is a prescribed data string 587, which is the series of alphanumeric characters that normally start the PE header (e.g. "PE00"). If so, the key 555 is verified so that the decryption logic utilizes the key 555 to decrypt the encrypted PE file 595, in accordance with XOR function 590, to recover a plaintext version 597 of the PE file. This plaintext file 597 is subsequent used in the malware analysis as described above.

In general, one inventive aspect is directed to a multi-level static analysis that comprises decryption of an encrypted object under analysis and/or static scanning operations of the plaintext (non-encrypted) object, where static scanning results are provided to the dynamic analysis engine 190 for subsequent VM-based analysis. The static scanning operations are configured to improve accuracy and efficiency in malware analysis. As alternative embodiments, it is contemplated that any or all of the above-described static scanning operations may be conducted concurrently.

VI. On-the-Fly Decryption of Embedded Encrypted Objects

Figure 6:
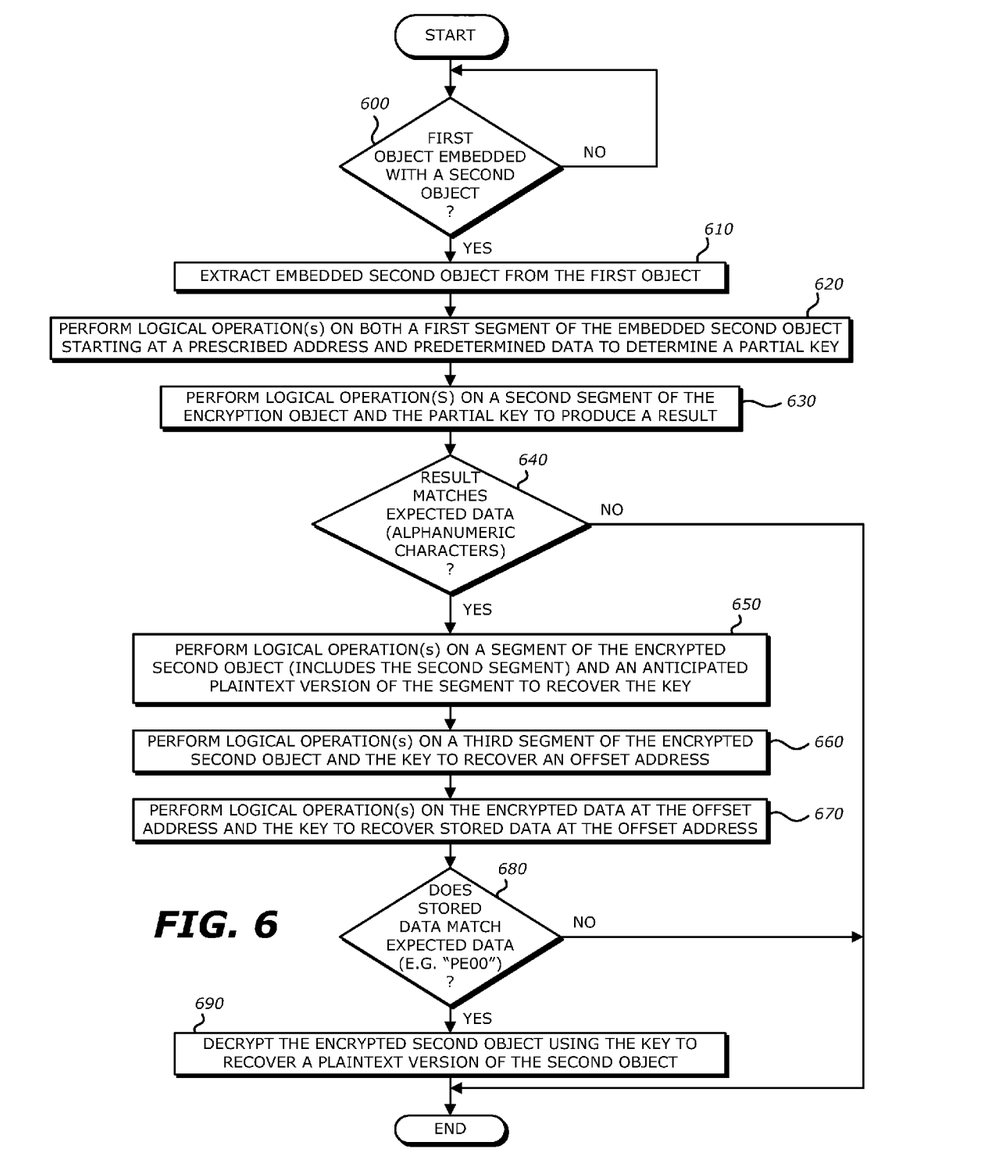
FIG. 6 is an exemplary flowchart illustrating the first static scanning operations conducted on a first object with an embedded encrypted object.

Referring now to FIG. 6, an exemplary flowchart illustrating the first static scanning operation conducted on a first object that is embedded with an encrypted, second object, such as an encrypted PE file for example, is shown. Herein, a determination is made whether a second object is embedded with the first object (block 600). If so, the embedded second object is extracted from the first object and one or more logical operations are conducted on both (i) a first (encrypted) segment of the embedded second object (PE file) starting at a prescribed address and (ii) predetermined data to produce the partial key (blocks 610 and 620). The prescribed address can be equated to a starting address for the first object along with a first address offset to the starting address of the second object. The predetermined data may be a series of alphanumeric character (e.g. "MZ"). The logical operation(s) are functionally equivalent to an XOR operation.

Thereafter, the logical operation(s) (e.g. XOR operation) is conducted on the partial key and a second segment of the encrypted object, namely encrypted data starting at a second address offset from the prescribed address associated with the embedded second object, to produce a result (block 630).

Next, the result is compared to a portion of one or more DOS Stub statements maintained within the database 175 of FIGS. 1A-1B (block 640). Upon detecting a successful match, in order to recover the key associated with the encrypted second object, one or more logical operations (e.g. an XOR operation) are conducted on the encrypted DOS Stub statement and a particular plaintext version of the anticipated DOS Stub statement maintained in the database 175 (block 650). The key may be determined by analyzing the result of the XOR operation for a repeating data pattern, where the repeating data pattern constitutes the key.

Next, logical operation(s) (e.g. an XOR operation) is conducted on the key and a third segment of the encrypted object at a third address offset from the prescribed address designating the start of the embedded second object (block 660). This operation produces a result, which constitutes the PE Header Offset address that it used to locate the PE Header associated with the PE file. The PE Header Offset is the address offset from the prescribed address, namely the starting address of the embedded second object, to the PE header.

Next, one or more logical operations (e.g. an XOR operation) are conducted on encrypted data at the PE Header Offset address to determine if the resultant data matches expected data (e.g. a particular series of alphanumeric characters such as "PE00") as set forth in blocks 670 and 680. If so, the key is verified and the decryption logic utilizes the key to decrypt the encrypted embedded second object to recover a plaintext version of the embedded second object for subsequent malware analysis (block 690).

In the foregoing description, the invention is described with reference to specific exemplary embodiments thereof. It will, however, be evident that various modifications and changes may be made thereto without departing from the broader spirit and scope of the invention as set forth in the appended claims.

The invention claimed is:

1. A computerized method for decrypting an encrypted object having a predetermined format that is received by an electronic device, the method comprising:
   performing, by a processor, one or more logical operations at least on (i) data associated with a first data string expected at a first location within the encrypted object having the predetermined format and (ii) data within the encrypted object at the first location to recover data associated with a portion of a cryptographic key from the encrypted object;
   conducting, by the processor, one or more logical operations at least on (i) the data associated with the portion of the cryptographic key and (ii) a first portion of the encrypted object at a second location within the encrypted object to produce a result, wherein the second location being different than the first location and the result includes a portion of data associated with a plaintext version of a second data string that is expected at the second location;
   responsive to the result including data associated with the plaintext version of the second data string, conducting one or more logical operations by the processor at least on (i) a second portion of the encrypted object and (ii) the data associated with the plaintext version of the second data string expected at the second location to recover data associated with the cryptographic key, wherein the recovered data associated with the cryptographic key includes the data associated with the portion of the cryptographic key; and
   decrypting, by the processor, the encrypted object using the cryptographic key to produce a decrypted object.

2. The computerized method of claim 1, wherein the recovered data associated with the cryptographic key is the cryptographic key and the data associated with the portion of the cryptographic key is a portion of the cryptographic key.

3. The computerized method of claim 1 further comprising:
   performing a static scanning operation associated with the decrypted object to determine whether the decrypted object is suspected of including malware; and
   classifying the decrypted object to identify a suspected presence of malware when the static scanning operation determines that the decrypted object includes malware.

4. The computerized method of claim 1, wherein the conducting of the one or more logical operations on the data associated with the first data string and the data within the encrypted object at the first location comprises conducting a first Exclusive OR (XOR) operation on a first plurality of alphanumeric characters and a portion of the encrypted object at a first prescribed address.

5. The computerized method of claim 4, wherein the one or more logical operations conducted on the second portion of the encrypted object and the data associated with the plaintext version of the second data string further comprises a second Exclusive OR (XOR) operation on the second portion of the encrypted object and the data associated with the plaintext version of the second data string, the data associated with the plaintext version of the second data string includes a second plurality of alphanumeric characters greater in number than the first plurality of alphanumeric characters of the first data string.

6. The computerized method of claim 1, wherein the conducting of the one or more logical operations on the second portion of the encrypted object and the data associated with the plaintext version of the second data string expected at the second location comprises conducting an Exclusive OR (XOR) operation on the second portion of the encrypted object that corresponds to a plurality of alphanumeric characters and the data associated with the plaintext version of the second data string corresponds to an anticipated plaintext version of the plurality of alphanumeric characters.

7. The computerized method of claim 1, wherein the data associated with the first data string comprises a first plurality of alphanumeric characters, the result comprises a second plurality of alphanumeric characters greater in number than the first plurality of alphanumeric characters, and the data associated with the second data string comprises a third plurality of alphanumeric characters greater in number than the second plurality of characters.

8. The computerized method of claim 7, wherein each of the logical operations operates as an Exclusive OR (XOR) operation.

9. The computerized method of claim 1, wherein prior to decrypting the encrypted object using the cryptographic key, the method further comprises validating the cryptographic key.

10. The computerized method of claim 9, wherein the validating of the cryptographic key comprises
    conducting one or more logical operations on both a third portion of the encrypted object and the cryptographic key to recover a value associated with an address offset;
    conducting one or more logical operations on the third portion of the encrypted object at the address offset and the cryptographic key to recover a data string; and
    comparing the data string to a prescribed data string expected at the address offset.

11. The computerized method of claim 1 further comprising analyzing the decrypted object by one or more virtual machines and monitoring for anomalous or unexpected activity indicative of the presence of malware.

12. The computerized method of claim 1, wherein the receiving of the encrypted object comprises (i) determining that the encrypted object is embedded with a second object and (ii) extracting the encrypted object from the second object.

13. A non-transitory computer readable medium that includes software that, when executed by a processor, decrypts an encrypted object having a predetermined format, comprising:

performing one or more logical operations at least on data associated with a first data string expected at a first location within an object having the predetermined format and data within the encrypted object at the first location to recover data associated with a portion of a cryptographic key from the encrypted object;

conducting one or more logical operations at least on the data associated with the cryptographic key and a first portion of the encrypted object at a second location within the encrypted object to produce a result, wherein the second location being different than the first location and the result includes a portion of data associated with a plaintext version of a second data string that is expected at the second location;

responsive to the result including data associated with the plaintext version of the second data string, conducting one or more logical operations at least on a second portion of the encrypted object and the data associated with the plaintext version of the second data string expected at the second location to recover data associated with the cryptographic key, wherein the recovered data associated with the cryptographic key includes the data associated with the portion of the cryptographic key; and decrypting the encrypted object using the cryptographic key to produce a decrypted object.

14. The non-transitory computer readable medium of claim 13, wherein the software, when executed by the processor, further perform operations comprising:

performing a static scanning operation associated with the decrypted object, where results of the static scanning operation are used to classify the decrypted object to identify a suspected presence of malware; and issuing one or more alerts to identify a presence of malware within the encrypted object.

15. The non-transitory computer readable medium of claim 13, wherein the one or more logical operations conducted on the data associated with the first data string and the data within the encrypted object at the first location comprises a first Exclusive OR (XOR) operation conducted on a first plurality of alphanumeric characters and a portion of the encrypted object at a first prescribed address.

16. The non-transitory computer readable medium of claim 15, wherein the one or more logical operations conducted on the second portion of the encrypted object and the data associated with the plaintext version of the second data string further comprises a second Exclusive OR (XOR) operation on the second portion of the encrypted object and the data associated with the plaintext version of the second data string, the data associated with the plaintext version of the second data string includes a second plurality of alphanumeric characters greater in number than the first plurality of alphanumeric characters of the first data string.

17. The non-transitory computer readable medium of claim 13, wherein the data associated with the first data string comprises a first plurality of alphanumeric characters, the result comprises a second plurality of alphanumeric characters greater in number than the first plurality of characters, and the data associated with the second data string comprises a third plurality of alphanumeric characters greater in number than the second plurality of alphanumeric characters.

18. The non-transitory computer readable medium of claim 17, each of the logical operations operates as one or more Exclusive OR (XOR) operations.

19. The non-transitory computer readable medium of claim 18, wherein prior to decrypting the encrypted object using the cryptographic key, the software, when executed by the processor, further validating the cryptographic key.

20. The non-transitory computer readable medium of claim 19, wherein the validating of the cryptographic key comprises conducting one or more logical operations on both a third portion of the encrypted object and the cryptographic key to recover a value associated with an address offset;

conducting one or more logical operations on the third portion of the encrypted object at the address offset and the cryptographic key to recover a data string; and comparing the data string to a prescribed data string expected at the address location.

21. The non-transitory computer readable medium of claim 13, wherein the software, when executed by the processor, further performs the operations comprising analyzing the decrypted object by virtual execution of the decrypted object by one or more virtual machines and monitoring for anomalous or unexpected activity indicative of the presence of malware.

22. An electronic device, comprising:
one or more hardware processors; and
a memory communicatively coupled to the one or more hardware processors, the memory including one or more software modules that, upon execution by the one or more hardware processors, conducts a first scanning operation on an encrypted object to recover a decrypted object, wherein the first scanning operation comprises performing one or more logical operations at least on data associated with a first data string expected at a first location within an object having the predetermined format and data within the encrypted object at the first location to recover data associated with a portion of a cryptographic key from the encrypted object, conducting one or more logical operations at least on the data associated with the cryptographic key and a first portion of the encrypted object at a second location within the encrypted object to produce a result, wherein the second location being different than the first location and the result includes a portion of data associated with a plaintext version of a second data string that is expected at the second location, responsive to the result including data associated with the plaintext version of the second data string, conducting one or more logical operations at least on a second portion of the encrypted object and the data associated with the plaintext version of the second data string expected at the second location to recover data associated with the cryptographic key, wherein the recovered data associated with the cryptographic key includes the data associated with the portion of the cryptographic key, and decrypting the encrypted object using the cryptographic key to produce the decrypted object.

23. The electronic device of claim 22, wherein the one or more hardware processors, upon execution of the one or more software modules, further comprises:

performing a second scanning operation associated with the decrypted object to determine whether the decrypted object is suspected of including malware; and classifying the decrypted object to identify a suspected presence of malware based on results of the second scanning operation.

24. The electronic device of claim 22, wherein the one or more hardware processors, upon execution of the one or more software modules, conducting the one or more logical operations on the data associated with and part of the first data string and the data within the encrypted object at the first location that comprises a first Exclusive OR (XOR) operation on a first plurality of alphanumeric characters and a portion of the encrypted object at a first prescribed address.

25. The electronic device of claim 24, wherein the one or more hardware processors, upon execution of the one or more software modules, conducting the one or more logical operations on the second portion of the encrypted object and the data associated with the plaintext version of the second data string that comprises a second Exclusive OR (XOR) operation on the second portion of the encrypted object and the data associated with the plaintext version of the second data string, the data associated with the plaintext version of the second data string includes a second plurality of alphanumeric characters greater in number than the first plurality of alphanumeric characters of the first data string.

26. The electronic device of claim 22, wherein the one or more hardware processors, upon execution of the one or more software modules, conduct the one or more logical operations on the second portion of the encrypted object and the data associated with the plaintext version of the second data string expected at the second location that comprise conducting an Exclusive OR (XOR) operation on the second portion of the encrypted object that corresponds to a first plurality of alphanumeric characters and the data associated with the plaintext version of the second data string corresponds to an anticipated plaintext version of the first plurality of alphanumeric characters.

27. The electronic device of claim 22, wherein the data associated with the first data string comprises a first plurality of alphanumeric characters, the result comprises a second plurality of alphanumeric characters greater in number than the first plurality of alphanumeric characters, and the data associated with the second data string comprises a third plurality of alphanumeric characters greater in number than the second plurality of characters.

28. The electronic device of claim 27, wherein the one or more hardware processors, upon execution of the one or more software modules, conduct the one or more logical operations that operate as one or more Exclusive OR (XOR) operations.

29. The electronic device of claim 22, wherein the one or more hardware processors, upon execution of the one or more software modules and prior to decrypting the encrypted object using the cryptographic key, further validates the cryptographic key.

30. The electronic device of claim 29, wherein the one or more hardware processors, upon execution of the one or more software modules, validates the cryptographic key by conducting one or more logical operations on both a third portion of the encrypted object and the cryptographic key to recover a value associated with an address offset;

conducting one or more logical operations on the third portion of the encrypted object at the address offset and the cryptographic key to recover a data string; and comparing the data string to a prescribed data string expected at the address offset.

31. The electronic device of claim 22, wherein the one or more hardware processors, upon execution of the one or more software modules, further performing a second scanning operation associated with the decrypted object to determine whether the decrypted object is suspected of including malware; and classifying the decrypted object to identify a suspected presence of malware based on results of the second scanning operation.

32. The electronic device of claim 22, wherein the one or more software modules further comprises a reporting module that, upon execution by the one or more hardware processors, transmits an alert indicating a presence of malware within the encrypted object.

33. The electronic device of claim 22, wherein prior to conducting the first scanning operation, the one or more hardware processors, upon execution of the one or more software modules, receive an object, determines that the object is embedded with a second object and (ii) extracting the second object as the encrypted object from the first object.

34. The electronic device of claim 33, wherein the alert comprises reference information that identifies a particular message or messages within the encrypted object that contains malware.

35. The electronic device of claim 34, wherein the reference information includes a pointer that points to a memory location associated with the particular message or messages that contain malware.

* * * * *